United States Patent Office 3,449,351
Patented June 10, 1969

3,449,351
CYCLO-ADDITION REACTIONS OF AMINOACETYLENES
Heinz G. Viehe, Linkebeek, Belgium, assignor to Union Carbide Corporation, a corporation of New York
No Drawing. Continuation-in-part of application Ser. No. 376,253, June 18, 1964. This application June 15, 1965, Ser. No. 464,232
Int. Cl. C07d 55/02, 29/00
U.S. Cl. 260—308                    5 Claims

ABSTRACT OF THE DISCLOSURE

Aminoacetylenes are reacted with compounds containing non-aromatic unsaturated sites to produce cyclic organic compounds. Examples include the reaction of azides with aminoacetylenes to produce aminotriazoles, the reaction of nitrile oxides with aminoacetylenes to produce amino-oxazoles, and the reaction of imines (Schiff bases) with aminoacetylenes to produce amidines (through a cyclic intermediate). The compounds produced by the process of the invention are useful as hydrogen halide acceptors.

---

This application is a continuation-in-part of application Ser. No. 376,253, filed June 18, 1964, now Patent No. 3,340,246.

This invention relates to addition reactions. More particularly, the invention is directed to chemical reactions in which a chemical compound containing at least one (non-aromatic) unsaturated site reacts with an aminoacetylene to form a cyclic organic compound. The invention is also directed to novel compositions of matter which are cyclic organic compounds produced by this cyclo-addition reaction.

Examples of the process of this invention are (a) the reaction of phenylazide, $C_6H_5N_3$, with the aminoacetylene $C_6H_5C{\equiv}CN(CH_3)_2$ to give

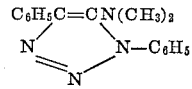

and (b) the reaction of phenylnitrile-N-oxide $$C_6H_5CN{\rightarrow}O$$

with the same aminoacetylene to give

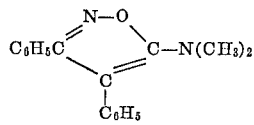

The term "non-aromatic unsaturated site," as used herein, includes carbon-carbon unsaturation such as double bonds, triple bonds and conjugated double and/or triple bonds, as well as unsaturation involving atoms other than carbon, such as carbonyl groups ($>C{=}O$), Schiff bases ($>C{=}N-$), nitrile-N-oxides ($-CN{\rightarrow}O$), azides ($-N{=}N{\equiv}N$), and the like.

The term "cyclo-addition reaction," as used herein, means the reaction of one or molecules of an aminoacetylene with one or more molecules of a compound containing at least one non-aromatic unsaturated site to produce a molecule of an organic compound which contains a ring of at least four members, the ring comprising (a) both (originally) acetylenic carbon atoms from each aminoacetylene molecule involved in the reaction and (b) at least two atoms which were part of a non-aromatic unsaturated site from each other (than aminoacetylene) molecule involved in the reaction. The molecular weight of the cyclic product is exactly the sum of the molecular weights of the reactant molecules.

According to the process of this invention, an aminoacetylene compound and a compound containing at least one non-aromatic unsaturated site are mixed together and maintained at a temperature sufficiently elevated to cause the reaction of the non-aromatic unsaturated site with the triple bond of the aminoacetylene to produce a cyclic compound containing a ring system of at least four members and derived from the acetylenic carbon atoms of the aminoacetylene and at least two atoms which prior to reaction were part of the non-aromatic unsaturated site. Following this initial cycloaddition reaction, the cyclic aminoacetylene derivative may or may not undergo further rearrangement.

The aminoacetylene compounds useful in the process of this invention are those represented by the formula (A)
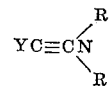

wherein R is a monovalent hydrocarbon group, Y is an R group, a hydrogen atom or an $NR_2$ group, and two R groups on the same nitrogen atom can together form a divalent alkylene group.

In the compounds of Formula A the various R groups can be the same or different throughout the same molecule, and the R groups preferably contain from 1 to about 18 carbon atoms.

The R groups in Formula A can be alkyl, aryl, alkaryl, aralkyl, alkenyl, alkynyl, cycloalkyl, cycloalkenyl, and the like groups. For example, R can be methyl, ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl, allyl, or butyne-2-yl groups, and the like, and two R groups on the same nitrogen atom can together be tetramethylene, 3-ethylhexamethylene, decamethylene, and the like.

Throughout the present specification and claims, $C_2H_5$, $C_6H_5$, $C_6H_4$, $C_4H_9$, i-$C_4H_9$ and t-$C_4H_9$ represent respectively the ethyl, phenyl, phenylene, normal butyl, isobutyl and tertiary butyl groups.

Typical compounds represented by Formula A are the following:

$$HC{\equiv}CN(CH_3)_2$$

$$C_6H_5C{\equiv}CN(CH_2CH_3)_2$$

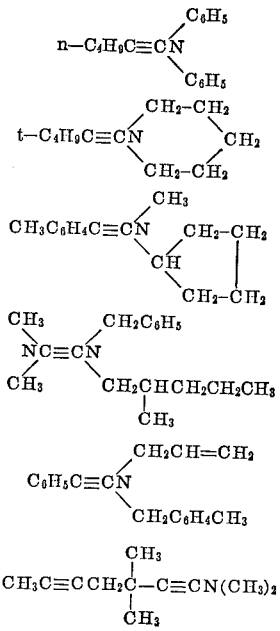

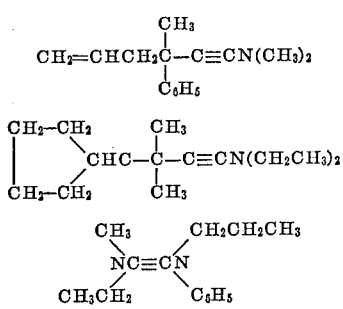

The compounds of Formula A can be prepared by the reaction of compounds represented by the following formulas

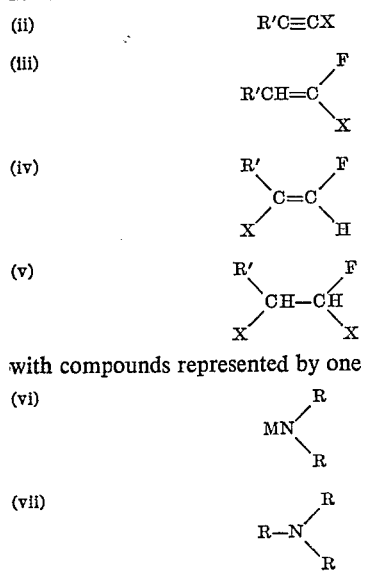

with compounds represented by one of the formulas (vi)        $MN\diagdown^R_R$ (vii)       $R-N\diagdown^R_R$ In Formulas ii, iii, iv, v, vi and vii, R has the meaning defined hereinabove with reference to Formula A, R' represents hydrogen or an R group, X represents a halogen, preferably fluorine, chlorine, or bromine, and M represents an alkali metal, namely, lithium potassium, rubidium, cesium or francium.

The process for producing the compounds of Formula A comprises mixing together in a hydrocarbon, hydrocarbon ether ortertiary amine solvent a compound of Formula ii, iii, iv or v and a compound of Formula vi or vii, and maintaining the mixture at a temperature between about −25° C. and 150° C. until the compound of Formula A is produced. Preferably, the reactants are employed in the ratio of at least one mole of the compound of Formula vi or vii per gram atom of halogen in the compound of Formula ii, iii, iv, or v. A slight excess of the compound of Formula vi or vii over and above this ratio is often desirable. Preferably the reaction mixture is stirred during the course of the reaction.

It is preferable to carry out the reaction producing compounds of Formula A under anhydrous conditions and in the absence of oxygen. This can be conveniently done by carrying out the reaction under an atmosphere of inert gas, such as nitrogen, argon, helium, and the like.

Organic solvents useful in this process include hydrocarbons, hydrocarbon ethers, and tertiary amines represented by Formula vii hereinabove. Illustrative solvents include hydrocarbons such as petroleum ether, cyclohexane, 2-ethylhexane, benzene, toluene, xylene, and the like, and ethers such as diethyl ether, di-isopropyl ether, methylbutyl ether, dioxane, tetrahydrofuran, ethylene glycol dimethyl ether, diethylene glycol dimethyl ether, and the like, and tertiary amines of Formula vii hereinabove.

Where highly volatile reactants, such as HC≡CF, t-C₄H₉CHBrCHBrF or CHF=CCl₂ are employed, it is preferable to form the reaction mixture at −80° C. or below and then warm the mixture to −20° C. to 25° C. where reaction will take place.

Compounds of the formula R₂NC≡CNR₂ (Y in Formula A is NR₂) can be produced by the reaction of a compound of the formula HXC=CFX with a compound of Formula vi. The reaction mixture is preferably formed at −80° C. or below and the reaction takes place on warming to room temperature. Where a mixture of compounds of Formula vi is employed, compounds of the formula R₂NC≡CNR₂ are produced wherein the two R₂N groups are different.

Where R' in Formula ii is hydrogen, the reaction of a compound of Formula ii with a compound of Formula vi first produces a compound having the formula

MC≡CNR₂ which on treatment with an aliphatic alcohol gives the desired compound HC≡CNR₂.

Where a compound of Formula vii is used, it is convenient to use an excess of this compound as a solvent.

The process can also be carried out using a mixture of compounds of Formulas vi and vii, both of which will then react with the compound of Formula ii, iii, iv or v to yield compounds of Formula A. For example, the reaction of C₆H₅C≡CCl with a mixture of LiN(CH₃)₂ and N(CH₃)₃ gives primarily

C₆H₅C≡CN(CH₃)₂ while the reaction of C₆H₅C≡CCl with a mixture of Lin(CH₂CH₃)₂ and N(CH₃)₃ gives a mixture of C₆H₅C≡CN(CH₃)₂ and C₆H₅C≡CN(CH₂CH₃)₂.

The relative amounts of products in such product mixtures depend on the relative reactivities of the compounds of Formulas vi and vii. In such reactant mixtures, the compound of Formula vii is both a reactant and a solvent.

Where a compound of Formula vii is used, and the R groups are not all the same, the primary product will depend on which nitrogen-R group bond is most easily broken. It has been found, for example, that a typical order of decreasing ease of R—N bond breaking is allyl-N, benzyl-N, methyl-N, ethyl-N, and n-propyl-N. Thus, the reaction of C₆H₅C≡CCl with

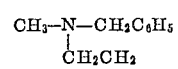

yields primarily

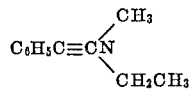

When the solvent is a hydrocarbon or hydrocarbon ether, the preferred reaction temperatures are −25° C. to 20° C., and when the solvent is a tertiary amine, higher temperatures up to 150° C. are preferred.

There is no particular advantage to be gained in carrying out the reaction at pressures other than atmospheric pressure. However, when a sealed reaction vessel is employed, the autogeneous pressure of the reaction mixture at the reaction temperature is satisfactory.

Formation of the compound of Formula A in good yield generally takes from a few hours up to several days depending on the particular temperature, solvent and reactants.

The reaction product, a compound of Formula A, is separated from the reaction mixture by conventional methods which include separation of liquid from precipitated salts and other solids, and isolation of the desired product by evaporation of solvent, fractional distillation, and the like. Product separation is preferably carried out under an inert atmosphere.

Examples of producing compounds of Formula A (underlined) are the following:

(a)
$$C_6H_5C\equiv CCl + LiN(CH_3)_2 \xrightarrow[\text{diethyl ether}]{-20°\text{ C. to } 25°\text{ C.}}$$
$$\underline{C_6H_5C\equiv CN(CH_3)_2} + LiCl$$

(b)
$$t\text{-}C_4H_9C\equiv CCl + N(CH_3)_3 \xrightarrow{135°\text{ C.}} \underline{t\text{-}C_4H_9C\equiv CN(CH_3)_2} + CH_3Cl$$

(c)
$$HC\equiv CF + 2LiN(CH_3)_2 \xrightarrow[\text{diethyl ether}]{\text{temp.}<20°\text{ C.}}$$
$$LiC\equiv CN(CH_3)_2 + LiF + HN(CH_3)_2$$
$$LiC\equiv CN(CH_3)_2 + (CH_3)_2CHOH \xrightarrow{\text{diethyl ether}}$$
$$\underline{HC\equiv CN(CH_3)_2} + (CH_3)_2CHOLi$$

(d)
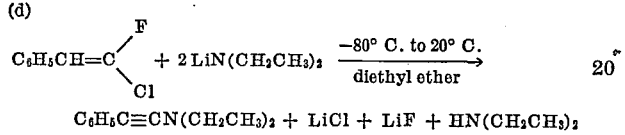
$$\underline{C_6H_5C\equiv CN(CH_2CH_3)_2} + LiCl + LiF + HN(CH_2CH_3)_2$$

(e)
$$C_6H_5CH\equiv CCl_2 + 2LiN(CH_3)_2 \xrightarrow[\text{diethyl ether}]{-80°\text{ C. to } 20°\text{ C.}}$$
$$\underline{C_6H_5C\equiv CN(CH_3)_2} + 2LiCl + HN(CH_3)_2$$

(f)
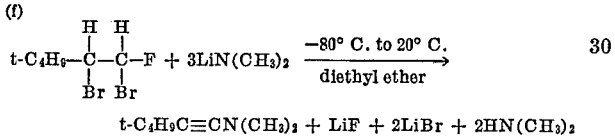
$$\underline{t\text{-}C_4H_9C\equiv CN(CH_3)_2} + LiF + 2LiBr + 2HN(CH_3)_2$$

(g)
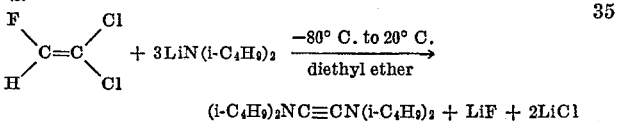
$$\underline{(i\text{-}C_4H_9)_2NC\equiv CN(i\text{-}C_4H_9)_2} + LiF + 2LiCl$$

Typical classes of compounds containing non-aromatic unsaturated sites which are useful in the process of this invention are those represented by the following formulas:

(B)          $RCON_3$    (R—C—N=N≡N)
                                   ∥
                                   O (C)          $ROCC\equiv CCOR$
                       ∥     ∥
                       O     O (D)          $RN_3$    (R—N=N≡N)

(E)          $RCN\rightarrow O$ (F)          $O\leftarrow NC-R''-CN\rightarrow O$ (G)          $\begin{matrix} R' \\ \phantom{R}\diagdown \\ \phantom{RR}C=O \\ \phantom{R}\diagup \\ R \end{matrix}$ (H)          $RCN_2R$    (R—C≡N=N—R)

(I)          $\begin{matrix} R'-C=N-R \\ | \\ R \end{matrix}$ (J)          $\begin{matrix} R' \\ \phantom{R}\diagdown \\ \phantom{RR}C=N-R \\ \phantom{R}\diagup \phantom{RR} | \\ R \phantom{RRR} O \end{matrix}$ In the above Formulas B–J, R and R' have the meanings defined hereinabove, and R'' is a divalent hydrocarbon group, preferably containing from one to about 10 carbon atoms, such as methylene, ethylene, 1,4-butylene, 1,4-cyclohexylene, para-phenylene, para-tolylene, 1,8-(2-ethyl) octylene, diphenylene, and the like.

The compounds of Formulas B–J are known and can be prepared by conventional methods.

The reaction of compounds of Formula A with compounds of Formula B in about 1:1 mole ratio produces compounds represented by the formula (AB)
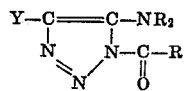

wherein Y and R have the meanings defined hereinabove. Illustrative compounds represented by Formula AB are the following:

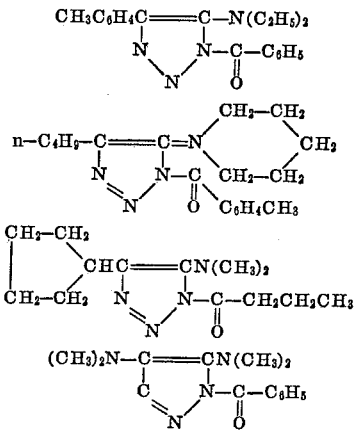

The reaction of compounds of Formula A with compounds of Formula C in about a 1:2 mole ratio produces compounds represented by the formula (AC)
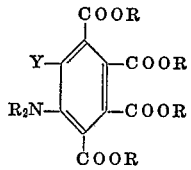

wherein Y and R have the meanings defined hereinabove. Illustrative compounds represented by Formula AC are the following:

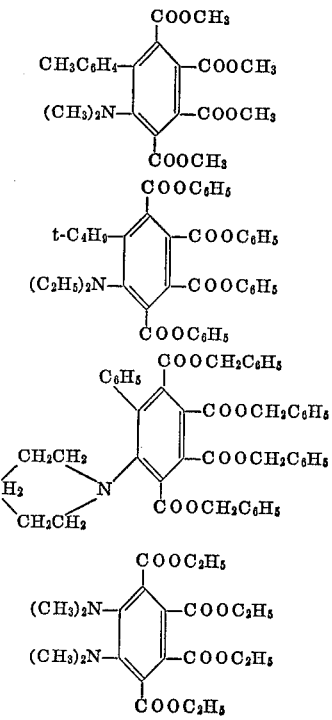

The reaction of compounds of Formula A with compounds of Formula D in about a 1:1 mole ratio produces compounds represented by the formula (AD)   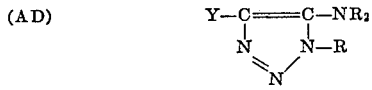

wherein Y and R have the meanings defined hereinabove. Illustrative compounds represented by Formula AD are the following:

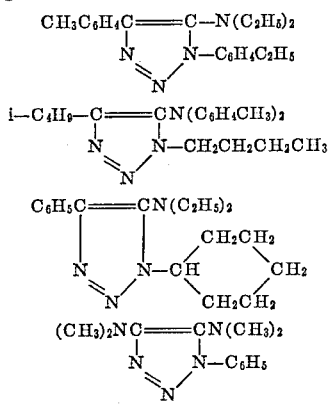

The reaction of compounds of Formula A with compounds of Formula E in about a 1:1 mole ratio produces compounds represented by the formula (AE)   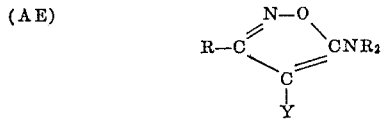

wherein Y and R have the meanings defined hereinabove. Illustrative compounds represented by Formula AE are the following:

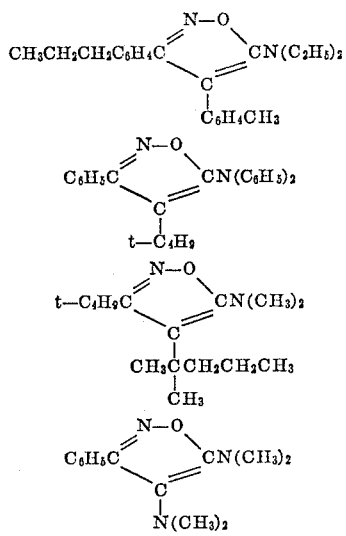

The reaction of compounds of Formula A with compounds of Formula F in about a 2:1 mole ratio produces compounds represented by the formula (AF)   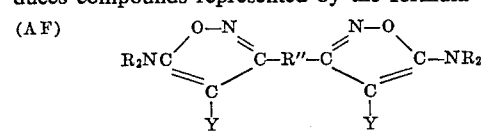

wherein Y, R and R″ have the meanings defined hereinabove. Illustrative compounds represented by Formula AF are the following:

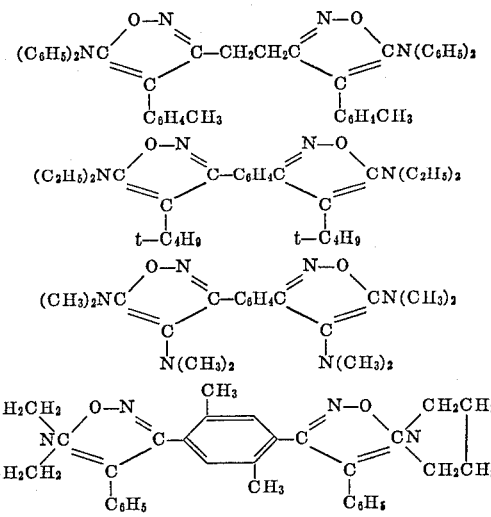

The reaction of compounds of Formula A with compounds of Formula G in about a 1:1 mole ratio produces compounds represented by the formula (AG–I)   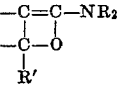

where Y, R and R′ have the meanings defined hereinabove. The cyclic compounds of Formula AG–I are transient intermediates which rearrange (almost instantaneously at room temperature) to give compounds represented by the formula (AG)   

where Y, R and R′ have the meanings defined hereinabove, and an R and R′ group on the same carbon atom can together form a divalent alkylene group. Illustrative compounds represented by the Formula AG are the following.

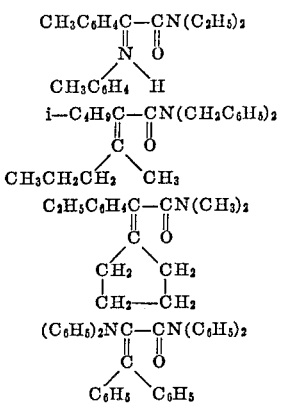

The reaction of compounds of Formula A with compounds of Formula H in about a 1:1 mole ratio produces compounds represented by the formula (AH)   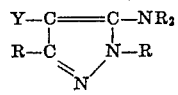

wherein Y and R have the meanings defined hereinabove. Illustrative compounds represented by Formula AH are the following:

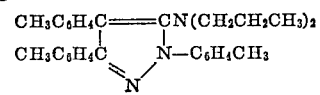

$$CH_3(CH_2)_4C=CN(C_6H_5)_2$$
$$C_6H_5-\underset{N}{C}\diagdown\underset{\diagup}{N}-C_6H_5$$

$$C_6H_5C=CN(CH_3)_2$$
$$CH_3(CH_2)-\underset{N}{C}\diagdown\underset{\diagup}{N}-(CH_2)_3CH_3$$

$$(C_2H_5)_2NC=CN(C_2H_5)_2$$
$$CH_3C_6H_4\underset{N}{C}\diagdown\underset{\diagup}{N}$$

The reaction of compounds of Formula A with compounds of Formula I in about a 1:1 mole ratio produces compounds represented by the formula (AI)
$$\begin{array}{c}Y-C=C-NR_2\\R'-\underset{R}{\overset{|}{C}}-\underset{}{\overset{||}{N}}-R\end{array}$$

wherein Y, R and R' have the meanings defined hereinabove. Illustrative compounds represented by Formula AI are the following:

$$C_6H_5CH_2CH_2C=CN(C_2H_5)_2$$
$$(CH_3C_6H_4)_2C-N-C_6H_4CH_3$$
$$CH_3C_6H_4C=CN(CH_2C_6H_5)_2$$
$$C_6H_5\underset{H}{C}-N-C_6H_5$$
$$t-C_4H_9C=CN(CH_2CH_2CH_3)_2$$
$$(C_2H_5)_2C-NC_6H_4CH_3$$
$$(CH_3)_2NC=CN(CH_3)_2$$
$$(C_6H_5)_2C-NC_6H_5$$

The compounds of Formula AI are stable at temperatures of 100° C. and above and can be distilled under reduced pressures. However, when treated with base at room temperature, the compounds of Formula AI rearrange easily to give compounds represented by the formula (AI–R)
$$\begin{array}{c}Y-C-C-NR_2\\R'-\overset{||}{C}\ \ \overset{||}{N}-R\\ \ \ \ \ R\end{array}$$

wherein Y, R and R' have the meanings defined hereinabove. Illustrative compounds represented by Formula AI–R are the following:

$$C_6H_5CH_2CH_2C-CN(C_2H_5)_2$$
$$(CH_3C_6H^4)_2\overset{||}{C}\ \overset{||}{N}C_6H_4CH_3$$
$$CH_3C_6H_4C-CN(CH_2C_6H_5)_2$$
$$C_6H_5\underset{H}{\overset{||}{C}}\ \overset{||}{N}C_6H_5$$
$$t-C_4H_9C-CN(CH_2CH_2CH_3)_2$$
$$(C_2H_5)_2\overset{||}{C}\ \overset{||}{N}C_6H_4CH_3$$
$$(CH_3)_2NC-CN(CH_3)_2$$
$$(C_6H_5)_2\overset{||}{C}\ \overset{||}{N}C_6H_5$$

The compounds of Formula AI–R react with organic halides of the Formula RX to give quaternary salts of the formula (AI–RQ)
$$\begin{array}{c}\ \ \ \ \ \ \ \ \ \ \ \ \ NR_2\\Y-C-C\overset{\oplus}{\diagup}\\R'-\overset{||}{C}\ \ \ \diagdown NR_2, X^{\ominus}\\ \ \ \ R\end{array}$$

wherein Y, R, R' and X have the meanings defined hereabove.

The reaction of compounds of Formula A with compounds of Formula J in about a 1:1 mole ratio produces compounds represented by the formula (AJ)
$$\begin{array}{c}\ \ \ \ \ \ R\\R'-\overset{|}{C}-----\overset{}{C}-Y\\R-\underset{}{N}\diagdown\underset{O}{\diagup}\overset{||}{C}-NR_2\end{array}$$

wherein Y, R and R' have the meanings defined hereinabove. Illustrative compounds represented by Formula AJ are the followin:

$$\begin{array}{c}\ \ \ \ \ \ C_6H_5\\H-\overset{|}{C}-----C-C_6H_4C_2H_5\\CH_3C_6H_4-N\diagdown\underset{O}{\diagup}\overset{||}{C}-N(C_2H_5)_2\end{array}$$

$$\begin{array}{c}\ \ \ \ \ \ C_6H_5\\C_6H_5\overset{|}{C}-----C-t-C_4H_9\\CH_3(CH_2)_3N\diagdown\underset{O}{\diagup}\overset{||}{C}-N(C_6H_5)_2\end{array}$$

$$\begin{array}{c}CH_2-CH_2-CH_2\\\overset{|}{C}H_2-CH_2-\overset{|}{C}-----O-C_6H_5\\C_6H_5-N\diagdown\underset{O}{\diagup}\overset{||}{C}-N(CH_3)_2\end{array}$$

$$\begin{array}{c}\ \ \ \ CH_3\\C_6H_5\overset{|}{C}-----C-N(C_2H_5)_2\\C_6H_5N\diagdown\underset{O}{\diagup}\overset{||}{C}-N(C_2H_5)_2\end{array}$$

The compounds of Formula A also react according to the process of this invention with compounds represented by the formulas:

(K) $RN=C=O$
(L) $R_2C=C=O$
(M) $R_2C=N\equiv N$
(N) $R_2SO_2$
(O) $S=C=O$
(P) $S=C=S$
(Q) $R-N=S=O$
(R) $R-N=C=N-R$
(S) $R'_2C=CH-COOR$
(T) $R'_2C=CHCN$
(U) $R'_2S=CHCH=CH'_2$
(V) $RR'C=CHCH=O$
(W) $R'C\equiv CR'$ wherein R and R' have the meanings defined hereinabove.

Also the compounds of Formula A can themselves react according to the process of this invention to give cyclic compounds of the formula (X)

$$R_2N-\underset{\underset{NR_2}{|}}{\overset{Y}{\diagup\diagdown}}-NR_2$$
$$Y-\diagdown\diagup-Y$$

wherein Y and R have the meanings defined hereinabove.

Also, the various Y and R groups in the compounds of Formula A can be substituted with one or more moieties which are inert to and do not interfere with the cycloaddition reaction of this invention, for example, halogens, halo-alkyl groups, alkoxy groups, aryloxy aryloxy groups, ether oxygen atoms and the like. Further, the two R groups on the same nitrogen can together form part of a heterocyclic ring including the nitrogen atom and one or more additional heteroatoms. For example, the compounds of Formula A can have the structure (Y)
$$YC\equiv CN\diagup\underset{CH_2CH_2}{\overset{CH_2CH_2}{\diagdown}}O$$

wherein Y has the meaning defined hereinabove.

Of course the various Y, R, R', R'' and X groups can each represent the same or different moieties throughout a single molecule of compounds of Formulas A–Y and Formulas ii–vii hereinabove.

The compounds of Formulas AB, AC, AD, AE, AF, AG, AH, AI, AI–R, and AJ, and the compounds produced by the reaction of compounds of Formula A with compounds of Formulas K–W, react with hydrogen halides and are therefore useful under anhydrous conditions as hydrogen halide acceptors. For example, all of the above described compounds produced by the process of this invention can be used as hydrogen halide acceptors in the process for producing cyclopentadienyl metal compounds described in Morehouse, U.S. 3,071,605 issued Jan. 1, 1963. The compounds of Formula AI–RQ react with strong bases such as lithium dimethylamide to give compounds of Formula AI–R.

The process of the present invention can be carried out with or without a solvent. However, use of inert organic solvent is preferred. Suitable inert solvents include hydrocarbons, and hydrocarbon ethers, for example, hydrocarbons such as petroleum ether, cyclohexane, 2-ethylhexane, benzene, toluene, xylene and the like, and ethers such as diethyl ether, di-isopropyl ether, methyl-butyl ether, dioxane, tetrahydrofuran, ethylene glycol dimethyl ether, diethylene glycol dimethyl ether, and the like. Operable solvents also include inert halogenated hydrocarbons such as chlorobenzene, bromobenzene, and the like.

The temperature at which the process of this invention can be carried out varies depending upon the particular reactants, presence or absence of solvents, whether or not a catalyst is used, and the like, and the proper choice of temperature is illustrated by the examples hereinbelow. Usually temperatures from about −20° C. up to about 100° C., and preferably from room temperature up to about 50° C., are satisfactory. When a solvent is employed, the boiling point of the solvent is often a convenient elevated temperature.

There is no particular advantage to be gained in carrying out the process of this invention at pressures other than atmospheric pressure. However, when a sealed reaction vessel is employed, the autogeneous pressure of the reaction mixture at the reaction temperature is satisfactory.

Although not absolutely necessary, it is preferable to employ boron trifluoride as a catalyst for the cycloaddition reaction of the process of this invention when the reactant containing the non-aromatic unsaturated site is a compound of Formula G or Formula I. Amounts of $BF_3$, conveniently used in the form of its etherate, in the amounts of from one to about 5 mole percent based on the amounts of reactant of Formula G or I have been found effective.

Since aminoacetylenes react readily with water, it is preferable to carry out the process of this invention under anhydrous conditions. This may be conveniently done by carrying out the process of this invention under an atmosphere of inert gas such as nitrogen, helium, argon, and the like.

The cycloaddition reaction of the process of this invention takes place in good yield in reaction times of from a few minutes up to several days depending on the particular temperature, solvent, presence or absence of catalyst, the particular reactants, and the like.

The products produced by the process of this invention can be separated from the reaction mixture by conventional methods including separation of liquid products from solid matter, isolation of the desired product by evaporation of solvent, fractional distillation, and the like. Several methods of product recovery are illustrated in the examples hereinbelow.

The ratio of reactants in the process of this invention is not narrowly critical. However, it is generally preferable to use reactant ratio which approximate the ratio in which the moieties derived from the various reactants appear in the reaction product, particularly where the Y or R groups of the compounds of formula A contain aliphatic unsaturation. Where, for example, an R or Y group of the aminoacetylene reactant contains a carbon-carbon triple bond, the cycloaddition reaction with the non-aromatic unsaturated site takes place preferentially at the aminoacetylene triple bond, that is at the functional unit $-C\equiv CN<$. Avoiding an excess of reactant containing the non-aromatic unsaturated site, eliminates any significant side reaction with other triple bonds in the compounds of formula A. Where the compound of formula A has a structure such as

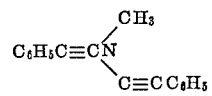

the triple bonds are equivalent and the cyloaddition reaction of this invention takes place at both triple bonds.

In the reactants of formulas G, I and J, and in the products of formulas AG, AI, AI–R, AI–RQ and AJ, an R group and an R' group on the same carbon atom can together form a divalent alkylene group.

In the compounds of formula I, the R group on the nitrogen atom and the R group on the carbon atom can together form a divalent alkylene group, such as $-CH_2CH_2CH_2CH_2-$, or other divalent group containing heteratoms, such as $-CH_2CH_2OCH_2CH_2-$.

The following examples further illustrate the process and compositions of this invention.

Example 1

Three millimoles of 1-phenyl-2-diethylaminoacetylene was added at room temperature to three millimoles of dimethyl acetylene dicarboxylate in 5 ml. of diethyl ether. After 2 hours, the solvent was evaporated, and the product N,N - diethyl - (2,3,4,5 - tetracarbomethoxy) - 6 - phenyl-aniline was distilled under vacuum. The distillate (product) crystallized and was recrystallized from diethyl ether. Melting point 140° C.

*Analysis.*—Calc.: C, 63.0; H, 5.95; N, 3.06. Found: C, 63.44; H, 5.82; N, 3.20.

Example 2

About 0.023 mole (3.7 g.) of 4,4'-terephthalonitrile-N,N'-dioxide- and 0.046 mole (8 g.) of 1-phenyl-2 diethylamino acetylene were placed in an Erlemmeyer flask with 150 ml. of dry dioxane. The mixture was stirred for 15 hours. The product 4,4'-paraphenylenebis-(4-phenyl-5-diethylamino-isoxazote) (10 g.) was then filtered and recrystallized from dioxane. Melting point 228° C. Yield 86%.

*Analysis.*—Calc.: C, 75.88; H, 6.71; N, 11.06. Found: C, 75.0; H, 6.92; N 10.85.

Example 3

A mixture of 0.011 mole (1.85 g.)

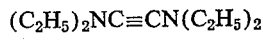

and 0.01 mole (2.0 g.) of

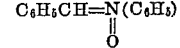

were mixed in 5 ml. toluene. The mixture was heated at its boiling point for 30 minutes.

The solution, containing the desired product, was concentrated by evaporation of solvent under pressure pressure. The product fraction was further purified by recrystallization from petroleum ether.

The yield of product,

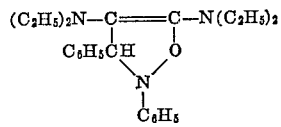

melting point 45° C., was 72%.

*Analysis.*—Calc.: C. 75.62; H, 8.50; N, 11.50. Found: C, 74.58; H, 8.43; N, 11.39.

The structure of the product was confirmed by ultra violet infra-red spectrum analysis.

Example 4

Following the general procedures of Example 3, the following additional examples of the process of this invention were carried out as set forth in Table 4-1. All products of Table 4-1 were identified by elemental analysis, molecular weight determination, and infra-red and violet spectral analysis.

In the fourth example of Table 4-1, the compound $C_6H_5C \equiv N = N — C_6H_5$ was prepared in situ by treating

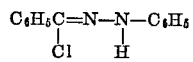

with base.

30 minutes on oily precipitate formed. The ether was evaporated. The residue, dissolved in chloroform, was washed with aqueous sodium chloride, then aqueous sodium acetate and dried over anhydrous sodium sulphate. The chloroform was evaporated and the residue fractionally distilled under reduced pressure. The product fraction was further purified by recrystallization (twice) from petroleum ether, and was identified by elemental analysis, molecular weight determination, infra-red and ultra violet spectral analysis. The yield of product,

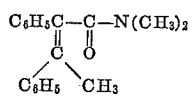

melting point 106–107° C., was 68%.

TABLE 4-1

| Aminoacetylene | Compound containing unsaturated site | Product | Melting point, ° C. | Yield, percent |
|---|---|---|---|---|
| $C_6H_5C \equiv CN(CH_3)_2$ | $C_6H_5N = N = N$ | $C_6H_5C{=}{=}{=}CN(CH_3)_2$ with ring N–N=N–$C_6H_5$ | 180 | 59 |
| $C_6H_5C \equiv CN(CH_3)_2$ | $C_6H_5CH = N — C_6H_5$, O | $C_6H_5C{=}{=}{=}CN(CH_3)_2$ with $C_6H_5CH$, O, N–$C_6H_5$ | 151 | 95 |
| $CH_3{-}C{\equiv}CN(CH_2CH_2)_2CH_2$ (morpholine-type) | $C_6H_5CH=N-C_6H_5$, O | $CH_3C{=}{=}{=}CN(CH_2CH_2)_2CH_2$ with $C_6H_5CH$, O, N–$C_6H_5$ | 144 | 89 |
| $C_6H_5C \equiv CN(CH_3)_2$ | $C_6H_5C=N-NC_6H_5$ | $C_6H_5C{=}{=}{=}CN(CH_3)_2$ with $C_6H_5C$, N–$C_6H_5$ | 128 | 63 |
| $C_6H_5C \equiv CN(CH_3)_2$ | $C_6H_5C-N=N=N$, O | $C_6H_5C{=}{=}{=}CN(CH_3)_2$ with ring N=N, N–CC$_6$H$_5$, O | 143 | 71 |
| $(i{-}C_4H_9)_2NC \equiv CN(i{-}C_4H_9)_2$ | $p{-}(O{=}N{\equiv}C{-})_2C_6H_4$ | $(i{-}C_4H_9)_2NC$ …ring… $C{-}C_6H_4{-}C$ …ring… $CN(i{-}C_4H_9)_2$ with $N(i{-}C_4H_9)_2$ groups | 144 | 45 |

Example 5

A mixture of 0.01 mole of $C_6H_5C \equiv CN(CH_3)_2$ and several drops of $BF_3 \cdot O(C_2H_5)_2$ were mixed in 5 ml anhydrous diethyl ether. To this mixture was added (dropwise) at room temperature a solution of 0.01 mole phenylmethyl ketone in 5 ml diethyl ether. An exothermic reaction took place which caused the ether to boil. After

Example 6

Following the general procedures of Example 5, the following additional examples of the process of this invention were carried out as set forth in Table 6-1. The products of Table 6-1 were identified by elemental analysis, molecular weight determination, and infra-red and ultra violet spectral analysis.

TABLE 6-1

| Aminoacetylene | Compound containing unsaturated site | Product | Melting point, ° C. | Yield, percent |
|---|---|---|---|---|
| $C_6H_5C \equiv CN(CH_3)_2$ | $C_6H_5CHO$ | $C_6H_5C{-}CN(CH_3)_2$, $C_6H_5C$, O, H | 84–85 | 67 |
| $C_6H_5C \equiv CN(CH_3)_2$ | $CH_3CCH_3$, O | $C_6H_5C{-}CN(CH_3)_2$, $CH_3{-}C$, O, $CH_3$ | 56–57 | 69 |

| Aminoacetylene | Compound containing unsaturated site | Product | Melting point, °C. | Yield, percent |
|---|---|---|---|---|
| C₆H₅C≡CN(CH₃)₂ | 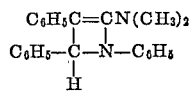 | 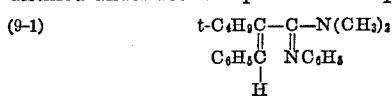 | 65–66 | 57 |
| C₆H₅C≡CN(CH₃)₂ | 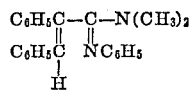 | 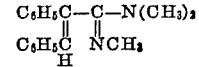 | 75–76 | 56 |
| t-C₄H₉C≡CN(CH₃)₂ | C₆H₅CHO | 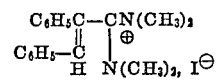 | 70–71 | 75 |

Example 7

About 0.01 mole of C₆H₅C≡CN(CH₃)₂ and 0.01 mole of C₆H₅CH=N—C₆H₅ were dissolved in 10 ml. diethyl ether, and about 5 drops of BF₃·O(C₂H₅)₂ was added to this solution. The reaction mixture was heated at its boiling point for 24 hours. An oily precipitate formed which was discarded. The ether solution, containing the desired product, was concentrated by evaporation of solvent and fractionally distilled under reduced pressure.

The product (7–1), $$\begin{array}{c}C_6H_5C=CN(CH_3)_2\\|\quad|\\C_6H_5-C-N-C_6H_5\\|\\H\end{array}$$

melting point 87–88° C., was obtained in 43% yield.

The product (7–1) was dissolved in diethyl ether and agitated with a 5% aqueous solution of sodium hydroxide. The organic phase was separated, dried and evaporated to dryness. The residue was the rearrangement product of compound (7–1) and had the structure (7–2)
$$\begin{array}{c}C_6H_5C-C-N(CH_3)_2\\\|\quad\|\\C_6H_5C\quad NC_6H_5\\|\\H\end{array}$$

melting point 114° C.

Both products, (7–1) and (7–2), were identified by elemental analysis, molecular weight determination, and infra red and ultra violet spectrum analysis.

Example 8

Following the procedures and analysis methods of Example 7, C₆H₅C≡CN(CH₃)₂ and C₆H₅CH=N—C₄H₉ (with BF₃·O(C₂H₅)₂ catalyst) reacted to give (8–1)

$$\begin{array}{c}C_6H_5C=CN(CH_3)_2\\|\quad|\\C_6H_5-C-NC_4H_9\\|\\H\end{array}$$

boiling point 140° C./0.3 mm. Hg. 70% yield. Treatment of compound (8–1) with aqueous NaOH gave (8–2)
$$\begin{array}{c}C_6H_5C-C-N(CH_3)_2\\\|\quad\|\\C_6H_5-C\quad NC_4H_9\\|\\H\end{array}$$

boiling point 145° C./0.1 mm. Hg.

Example 9

About 0.01 mole of t-C₄H₉-C≡CN(CH₃)₂ and 0.01 mole of C₆H₅CH=NC₆H₅ were dissolved in 5 ml. of ethylene glycol dimethyl ether, and about 5 drops of BF₃·O(C₂H₅)₂ was added to this solution. The reaction mixture was heated at about 70° C. for 18 hours. An oily precipitate which formed was discarded. The solution was evaporated to dryness and the residue fractionally distilled under reduced pressure. The product (9–1)
$$\begin{array}{c}t-C_4H_9C-C-N(CH_3)_2\\\|\quad\|\\C_6H_5C\quad NC_6H_5\\|\\H\end{array}$$

boiling point 143–147° C./0.1 mm. Hg. was obtained in 30% yield. The product was identified by elemental analysis, molecular weight determination, and infra-red and ultra violet spectrum analysis.

The same product, (9–1), was obtained when t—C₄H₉≡CN(CH₃)₂ and C₆H₅CH=NC₆H₅ (without solvent or catalyst) were heated in a sealed tube at 200° C. for 24 hours, and the reaction mixture fractionally distilled under reduced pressure.

Example 10

The compound $$\begin{array}{c}C_6H_5C-C-N(CH_3)_2\\\|\quad\|\\C_6H_5C\quad NCH_3\\|\\H\end{array}$$

prepared by the methods of Example 7, was treated with excess methyl iodide. The resulting product had the structure $$\begin{array}{c}C_6H_5C-CN(CH_3)_2\\\|\quad|\oplus\\C_6H_5-C\quad\\H\quad N(CH_3)_2,\ I^\ominus\end{array}$$

What is claimed is:

1. The process which comprises (1) mixing together (a) an aminoacetylene represented by the formula YC≡CNR₂ wherein R is a monovalent hydrocarbon group containing from one to about 18 carbon atoms, Y is selected from the class consisting of R groups, hydrogen and NR₂ groups, and two R groups on the same nitrogen atom can together form an alkylene group of up to 10 carbon atoms, and (b) a compound represented by the formula RCON₃, wherein R has the meaning defined hereinabove, and (2) maintaining said mixture at a temperature of from about −20° to about +100° C., to produce a compound represented by the formula

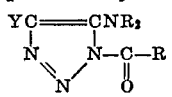

wherein R and Y have the meaning defined hereinabove.

2. The process which comprises (1) mixing together (a) an aminoacetylene represented by the formula YC≡CNR$_2$ wherein R is a monovalent hydrocarbon group containing from one to about 18 carbon atoms, Y is selected from the class consisting of R groups, hydrogen and NR$_2$ groups, and two R groups on the same nitrogen atom can together form an alkylene group of up to 10 carbon atoms, and (b) a compound represented by the formula RN$_3$, wherein R has the meaning defined hereinabove, and (2) maintaining said mixture at a temperature of from about −20° C. to about 100° C., to produce a compound represented by the formula

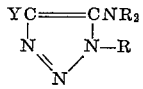

wherein R and Y have the meanings defined hereinabove.

3. A compound represented by the formula

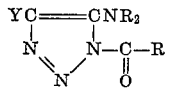

wherein R is a monovalent hydrocarbon group containing from one to about 18 carbon atoms, Y is selected from the class consisting of R groups, hydrogen and NR$_2$ groups, and two R groups on the same nitrogen atom can together form an alkylene group of up to 10 carbon atoms.

4. A compound represented by the formula

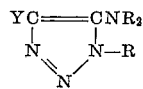

wherein R is a monovalent hydrocarbon group containing from one to about 18 carbon atoms, Y is selected from the class consisting of R groups, hydrogen and NR$_2$ groups, and two R groups on the same nitrogen atom can together form an alkylene group of up to 10 carbon atoms.

5. The compound represented by the formula

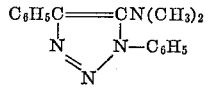

References Cited

Dimroth: Chem. Abstracts, vol. 364, pp. 1170–1, (1909).

ALEX MAZEL, *Primary Examiner.*

BERNARD I. DENTZ, *Assistant Examiner.*

U.S. Cl. X.R.

260—239, 293, 294.3, 294.7, 307, 308, 310, 313, 326.3, 326.5, 471, 557, 558, 561, 562